(12) United States Patent
Hashimoto et al.

(10) Patent No.: US 12,162,144 B2
(45) Date of Patent: Dec. 10, 2024

(54) SUBSTRATE ASSEMBLING DEVICE AND SUBSTRATE ASSEMBLING METHOD

(71) Applicant: Kawasaki Jukogyo Kabushiki Kaisha, Kobe (JP)

(72) Inventors: Takeshi Hashimoto, Kobe (JP); Keita Sasaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 419 days.

(21) Appl. No.: 17/613,490

(22) PCT Filed: Jun. 1, 2020

(86) PCT No.: PCT/JP2020/021604
§ 371 (c)(1),
(2) Date: May 18, 2022

(87) PCT Pub. No.: WO2020/241900
PCT Pub. Date: Dec. 3, 2020

(65) Prior Publication Data
US 2022/0347838 A1    Nov. 3, 2022

(30) Foreign Application Priority Data

May 31, 2019   (JP) ................................. 2019-102504

(51) Int. Cl.
*B23P 19/06*        (2006.01)
*B25J 9/04*         (2006.01)
*B25J 9/16*         (2006.01)
*B25J 15/00*        (2006.01)

(52) U.S. Cl.
CPC ............... *B25J 9/043* (2013.01); *B23P 19/06* (2013.01); *B25J 9/1687* (2013.01); *B25J 15/0019* (2013.01); *G05B 2219/39001* (2013.01); *G05B 2219/40066* (2013.01)

(58) Field of Classification Search
CPC ...... B25J 9/043; B25J 9/1687; B25J 15/0019; B23P 19/06; G05B 2219/39001; G05B 2219/40066
See application file for complete search history.

(56) References Cited

U.S. PATENT DOCUMENTS 8,660,688 B2 *  2/2014  Urabe .................... B25J 9/0087
                                                    700/258

FOREIGN PATENT DOCUMENTS

JP          6-091451 A       4/1994
JP          2016-60000 A     4/2016

* cited by examiner

*Primary Examiner* — Nirvana Deonauth
(74) *Attorney, Agent, or Firm* — XSENSUS LLP

(57) ABSTRACT

A substrate assembling device includes a first end effector attached to a first arm, a second end effector attached to a second arm, and a controller. The second end effector includes a pair of grippers configured to grip a second substrate, and a placing part where threaded elements are placed. The controller is adapted to control operations of the first arm and the second arm to position the second substrate on a first substrate while gripping the second substrate, by using the pair of grippers of the second end effector, and hold the threaded element placed on the placing part of the second end effector and fasten the held threaded element, by using the first end effector, to join the first substrate and the second substrate together.

20 Claims, 12 Drawing Sheets

SUBSTRATE ASSEMBLING DEVICE AND SUBSTRATE ASSEMBLING METHOD

CROSS-REFERENCE TO RELATED APPLICATIONS

The present application is based on PCT filing PCT/JP2020/021604, filed Jun. 1, 2020, which claims priority to JP 2019-102504, filed May 31, 2019, the entire contents of each are incorporated herein by reference.

TECHNICAL FIELD

The present disclosure relates to a substrate assembling device and a substrate assembling method using the same.

BACKGROUND ART

Conventionally, at a manufacturing site of electronic equipment, such as computers, an assembly of an electronic substrate is performed by a worker. The assembly of the electronic substrate includes, for example, a process for attaching threaded spacers on a main substrate, a process for mounting electronic components on an assembly substrate, and a process for positioning the assembly substrate at a predetermined position and threadedly fastening the assembly substrate to the main substrate.

In recent years, it is proposed that a robot and a worker perform a work jointly in the same workspace from the viewpoint of the productivity improvement in various fields. When introducing a humanoid work robot at the manufacturing site described above and performing the assembly of the substrate, the robot must carry out the complicated work process accurately, similarly to the worker.

Conventionally, an automatic thread-fastening device used for an assembly of an electric appliance and a mechanical apparatus is known (for example, see Patent Documents 1 and 2).

REFERENCE DOCUMENTS OF CONVENTIONAL ART

Patent Documents

[Patent Document 1] JP1994-091451A
[Patent Document 2] JP2016-060000A

DESCRIPTION OF THE DISCLOSURE

Problem to be Solved by the Disclosure

The conventional automatic thread-fastening device described above is aimed at the work for threadedly fastening at the predetermined position of the substrate. Therefore, there is room for a further improvement in applying the above conventional technology to the substrate assembly as described above.

The present disclosure is made in order to solve the above problem, and one purpose thereof is to improve the productivity of a substrate assembly accompanied by threadedly fastening at a manufacturing site of electronic equipment.

SUMMARY OF THE DISCLOSURE

In order to achieve the purpose, a substrate assembling device according to one aspect of the present disclosure joins a first substrate and a second substrate together to assemble a substrate. The device includes a base, a first arm attached to the base, a second arm attached to the base, a first end effector detachably attached to a tip end of the first arm, and configured to hold and fasten a threaded element, a second end effector detachably attached to a tip end of the second arm, and a controller configured to control operations of the first arm and the second arm. The second end effector includes a base, a pair of grippers provided to the base and configured to grip the second substrate, and a placing part disposed on the base, where threaded elements are placed. The controller controls the operations of the first arm and the second arm to position the second substrate on the first substrate while gripping the second substrate by using the pair of grippers of the second end effector, and hold the threaded element placed on the placing part of the second end effector and fasten the held threaded element, by using the first end effector, to join the first substrate and the second substrate together and assemble the substrate.

According to this configuration, for example, by a dual-arm robot, the pair of grippers of the second end effector at the tip end of the second arm positions the second substrate on the first substrate while gripping the second substrate. Then, the first end effector at the tip end of the first arm holds the threaded element placed on the placing part of the second end effector and fastens the held threaded element. Thus, the substrate can be assembled by joining the first substrate and the second substrate together. Therefore, the productivity of the substrate assembly accompanied by the threadedly fastening can be improved.

Moreover, the second end effector may further include a coupling part configured to detachably attach a threaded element holder or the placing part to the coupling part, wherein the threaded element holder is configured to hold the threaded element. The controller may control the operations of the first arm and the second arm so that the threaded element holder is coupled to the coupling part of the second end effector, the threaded element holder places the held threaded element on the placing part disposed at a predetermined position, the placing part is coupled to the coupling part of the second end effector, the pair of grippers of the second end effector positions the second substrate on the first substrate while gripping the second substrate, and the first end effector holds the threaded element placed on the placing part of the second end effector and fastens the held threaded element to join the first substrate and the second substrate together and assemble the substrate.

According to this configuration, for example, the dual-arm robot itself can place the threaded element on the placing part by the threaded element holder coupled to the second end effector and can then couple the placing part to the second end effector. Thus, the substrate assembling device is unnecessary to be provided with any device for feeding the threaded element. The substrate assembly can be realized by a robot system alone.

The placing part may have placement spaces where the threaded elements are placeable. According to this configuration, since it is unnecessary to feed the threaded elements during the substrate assembly, the productivity further improves.

The substrate assembling device may further include a third end effector configured to be detachably attached to a tip end of the first arm, and configured to hold a threaded spacer configured to connect the first substrate and the second substrate to each other and to fasten the threaded spacer. The controller may control the operation of the first arm so that the third end effector is attached to the tip end of the first arm, and the third end effector holds the threaded spacer and fastens the held threaded spacer onto the first substrate.

Moreover, the substrate assembling device may further include a fourth end effector configured to be detachably attached to a tip end of the second arm, and configured to hold an electronic component. The controller may control the operation of the second arm so that the fourth end effector is attached to the tip end of the second arm, and the fourth end effector mounts the held electronic component onto the second substrate.

Generally, when mounting an electronic component (e.g., a memory) onto a substrate, a body part of the electronic component is disposed on the substrate and a terminal part of the electronic component penetrates a through-hole formed on the substrate and is fixed (e.g., soldered) onto the substrate at the backside of the substrate. According to this configuration, since the first substrate and the second substrate can be joined together with a predetermined gap therebetween by fastening the threaded spacer onto the first substrate, an upper surface of the first substrate will not contact with the terminal etc. of the electronic component positioned on the backside of the second substrate. According to this configuration, at a manufacturing site of the electronic equipment, the productivity of assembling the substrate mounted with the electronic component improves.

Note that the first end effector may be configured to hold the threaded element by sucking the threaded element with negative pressure and to fasten the threaded element.

According to this configuration, by using as the first end effector a suction-type driver (screwdriver), the efficient thread fastening can be carried out and the productivity of the substrate assembly further improves.

According to another aspect of the present disclosure, a substrate assembling method is provided, which joins a first substrate and a second substrate together to assemble a substrate by a substrate assembling device. The substrate assembling device includes a base, a first arm attached to the base, a second arm attached to the base, a first end effector detachably attached to a tip end of the first arm, and configured to hold and fasten a threaded element, a second end effector detachably attached to a tip end of the second arm, and a controller configured to control operations of the first arm and the second arm. The second end effector includes a base, a pair of grippers provided to the base and configured to be grip both ends of the second substrate, and a temporary placing part disposed in the base, where threaded elements are placed. The controller controls the operations of the first arm and the second arm to position the second substrate on the first substrate while gripping the both ends of the second substrate, by the pair of grippers of the second end effector, and hold the threaded element placed on the temporary placing part of the second end effector and fasten the held threaded element, by the first end effector, to join the first substrate and the second substrate together and assemble the substrate.

Effect of the Disclosure

The present disclosure has the configuration described above and can improve the productivity of a substrate assembly accompanied by threadedly fastening at a manufacturing site of electronic equipment.

MODES FOR CARRYING OUT THE DISCLOSURE

Figure 1:
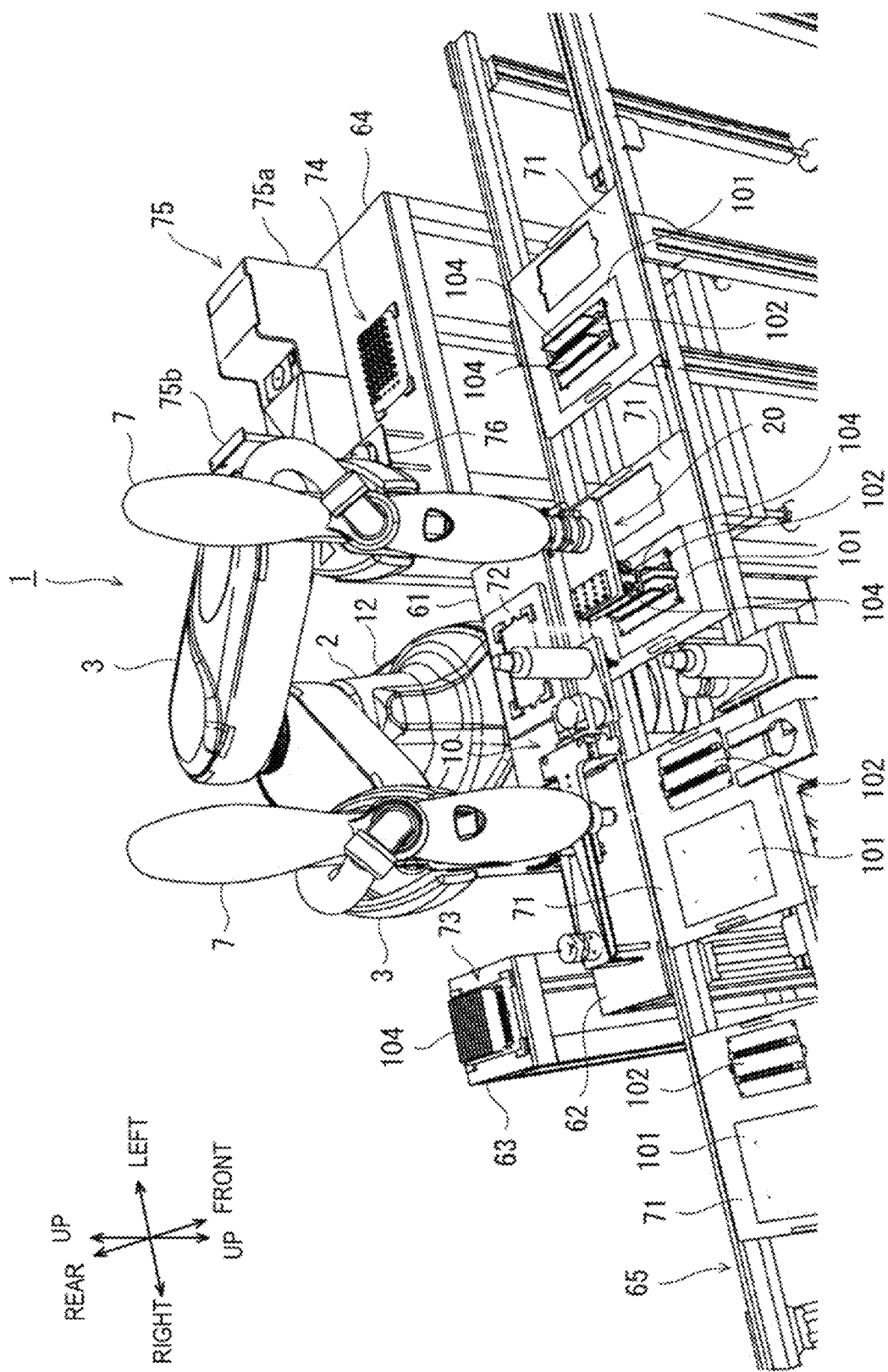
FIG. 1 is a view illustrating a substrate assembling device according to one embodiment of the present disclosure.

Hereinafter, a desirable embodiment is described with reference to the drawings. Note that, below, the same reference characters are assigned to the same or corresponding elements throughout the drawings to omit redundant description. Moreover, the drawings are to schematically illustrate each component for easier understanding.

Embodiment

FIG. 1 is a view illustrating a substrate assembling device according to one embodiment of the present disclosure. The substrate assembling device of this embodiment is introduced into a manufacturing site of electronic equipment, such as computers, for example, and performs a work for joining two substrates together (hereinafter, referred to as "the substrate assembly"). As illustrated in FIG. 1, the substrate assembling device is comprised of a robot 1 provided with a base 2, and a pair of robotic arms 3 (hereinafter, may simply be referred to as "the arm(s)") attached to the base 2. Below, a direction in which the pair of arms are extended is referred to as "the left-and-right direction." A direction parallel to the axial center of a base shaft of the base 2 is referred to as "the up-and-down direction." A direction perpendicular to the left-and-right direction and the up-and-down direction is referred to as "the front-and-rear direction." In this embodiment, the robot 1 operates the left-and-right arms 3 to carry out the substrate assembly by using end effectors 10 and 20 attached to tip ends (wrist parts 7) of the arms 3.

A first table 61 is installed in front of the base 2 of the robot 1. A workbench 72 is disposed on the first table 61. The robot 1 performs a work for mounting electronic components 104 onto a second substrate 102 on the workbench 72. A conveyor 65 is disposed in front of the first table 61. The conveyor 65 has a pair of rail members extending in the left-and-right direction. A plurality of work plates 71 are placed on the pair of rail members so that they are movable thereon in the left-and-right direction. A first substrate 101 and the second substrate 102 are disposed on each work plate 71. The robot 1 performs the assembly of these substrates on the work plate 71 located in front thereof. The work plate 71 for which the substrate assembly is finished is conveyed on the conveyor 65 one by one. A second table 62 is disposed on the left side of the first table 61. An end effector which is replaceable at the tip end of the right arm 3 of the robot 1 is disposed on the second table 62. A third table 63 is disposed obliquely rearward and rightward of the second table 62. A component case 73 which accommodates the electronic components 104 is disposed on the third table 63. The electronic component 104 is an integrated circuit, such as a memory, mounted on the substrate. A fourth table 64 is installed on the left side of the base 2 of the robot 1. A thread case 74 and a threaded element feeding device 75 are disposed on the fourth table 64. Threaded spacers are placed in the thread case 74. In this embodiment, the threaded element feeding device 75 includes a threaded element sending-out unit 75a and a threaded element feeding unit 75b. The threaded element sending-out unit 75a is a device which accommodates a plurality of threaded elements (screws) and sends out the accommodated threaded elements one by one. The threaded element feeding unit 75b is a device which holds the threaded element sent out one by one from the threaded element sending-out unit 75a and feeds it to the robot 1.

Figure 2:
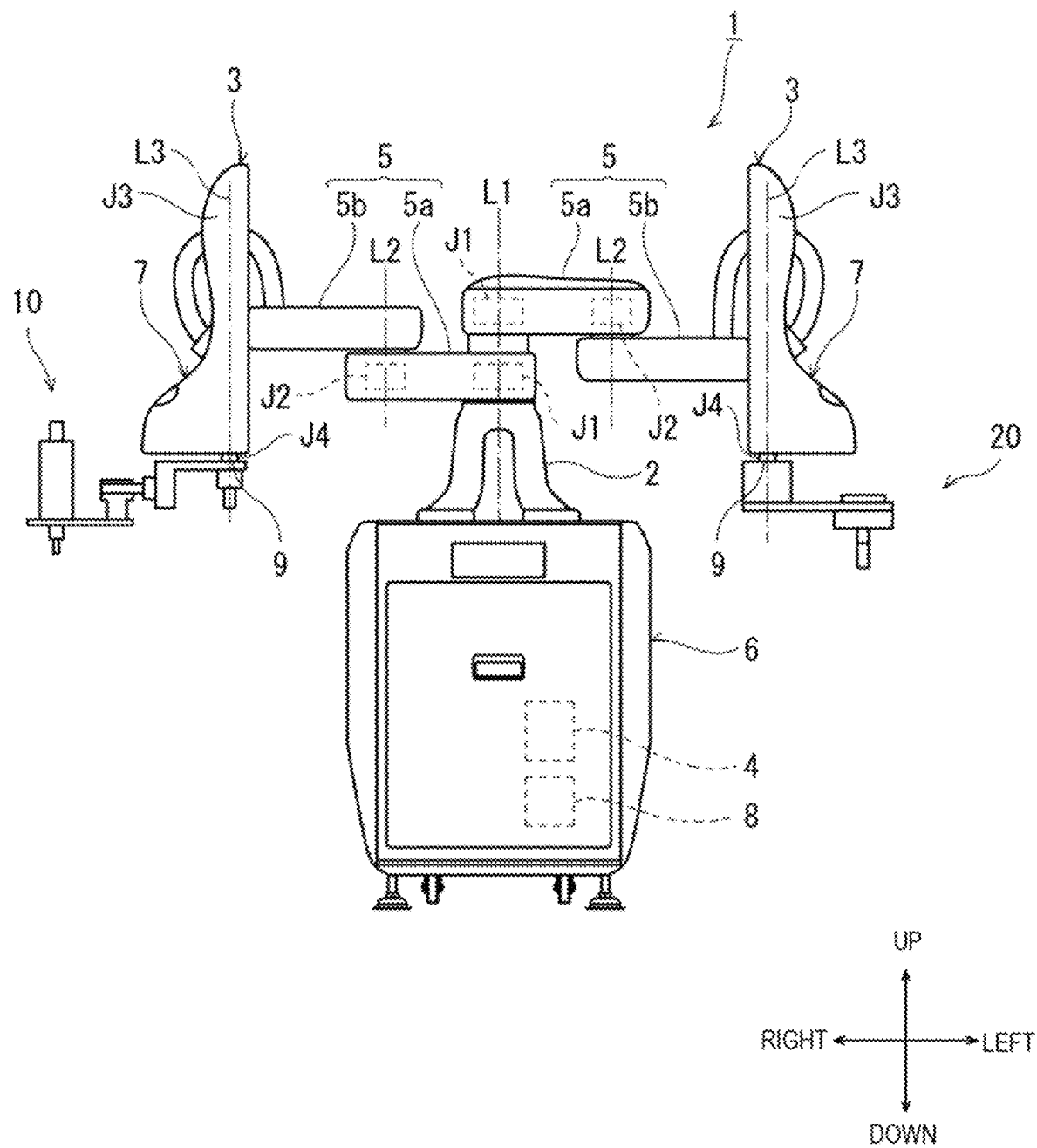
FIG. 2 is a front view schematically illustrating the entire configuration of a robot.

FIG. 2 is a front view schematically illustrating the entire configuration of the robot 1. As illustrated in FIG. 2, the robot 1 includes the base 2 fixed to a carriage 6, the pair of arms 3 supported by the base 2, and a controller 4 and a vacuum generating device 8 which are stored inside the base 2. The vacuum generating device 8 is a device which, for example, generates negative pressure in a suction-type driver 12b described later (see FIG. 3), such as a vacuum pump and CONVUM®. The front-and-rear and left-and-right dimensions of the carriage 6 is 610 mm×620 mm, for example. Therefore, the robot 1 can be installed in a limited space equivalent to one person. Each arm 3 is a horizontal articulated robotic arm configured to be movable with respect to the base 2. The arm 3 is provided with an arm part 5 and the wrist part 7. Moreover, the left-and-right arms 3 can operate independently or collaboratively.

In this example, the arm part 5 is comprised of a first link 5a and a second link 5b. The first link 5a is coupled to a base shaft (not illustrated) fixed to an upper surface of the base 2 through a rotary joint J1, and is rotatable on a rotation axis L1 which passes through the axial center of the base shaft. The second link 5b is coupled to a tip end of the first link 5a through a rotary joint J2, and is rotatable on a rotation axis L2 which is defined at the tip end of the first link 5a.

The wrist part 7 is comprised of an elevating part 7a and a rotating part 7b. The elevating part 7a is coupled to a tip end of the second link 5b through a linear-motion joint J3, and is movable with respect to the second link 5b so as to ascend and descend. The rotating part 7b is coupled to a lower end of the elevating part 7a through a rotary joint J4, and is rotatable on a rotation axis L3 which is defined at the lower end of the elevating part 7a. The end effector 10 is coupled to the wrist part 7 of the right arm 3 through a mechanical interface 9. The end effector 20 is coupled to the wrist part 7 of the left arm 3 through the mechanical interface 9.

Each arm 3 of the above configuration has the joints J1-J4. The arm 3 is provided with driving servomotors (not illustrated), and encoders (not illustrated) which detect rotation angles of the servomotors, corresponding to the joints J1-J4. Moreover, the rotation axes L1 of the first links 5a of the two arms 3 are located on the same straight line, and the first link 5a of one of the arms 3 and the first link 5a of the other arm 3 are disposed with a height difference in the up-and-down direction.

Figure 3:
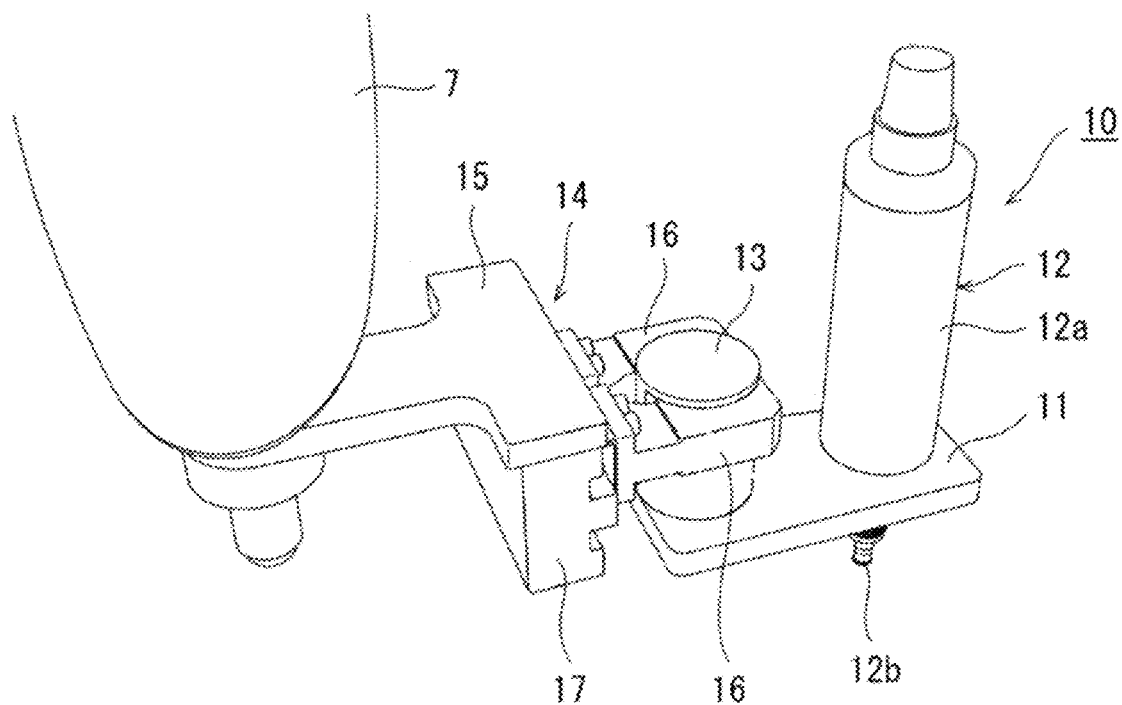
FIG. 3 is a perspective view illustrating a configuration of a first end effector.

Next, a configuration of the end effector 10 attached to the tip end of the right arm 3 is described. FIG. 3 is a perspective view illustrating the configuration of the end effector 10. The end effector 10 corresponds to a "first end effector" of the present disclosure. As illustrated in FIG. 3, the end effector 10 includes a base hand 14, an adapter 13 held by the base hand 14, a base 11 coupled to the adapter 13, and a threadedly-fastening part 12 attached to the base 11.

The base hand 14 includes a platform 15 and a pair of fingers 16 supported by the platform 15. The platform 15 is a T-shaped flat plate. A base-end side of the platform 15 is coupled to the mechanical interface 9 (see FIG. 2) provided to the wrist part 7 of the right arm 3. The pair of parallel fingers 16 are driven by an actuator 17 provided to a tip-end side of the platform 15, and translates while maintaining the parallelism so that they approach and separate to/from each other. The actuator may be comprised of an air cylinder or a linear-movement mechanism, for example.

An upper part of the adapter 13 has a solid or hollow cylindrical shape. An engagement part with which the fingers 16 of the base hand 14 engage is provided to an outer circumferential surface of the adapter 13.

The base 11 has a flat-plate shape. A base end of an upper surface of the base 11 is coupled to a lower part of the adapter 13, and a tip end of the upper surface of the base 11 is coupled to the threadedly-fastening part 12.

The threadedly-fastening part 12 includes a body part 12a of a cylindrical shape attached to the base 11, and the driver 12b attached to a tip end of the body part 12a. The body part 12a is configured to supply the negative pressure generated by the vacuum generating device 8 (see FIG. 2) to a tip end of the driver 12b. The driver 12b is a so-called suction-type driver. The driver 12b is configured to hold the threaded element by sucking the threaded element with the negative pressure, and threadedly fasten the threaded element.

Figure 4:
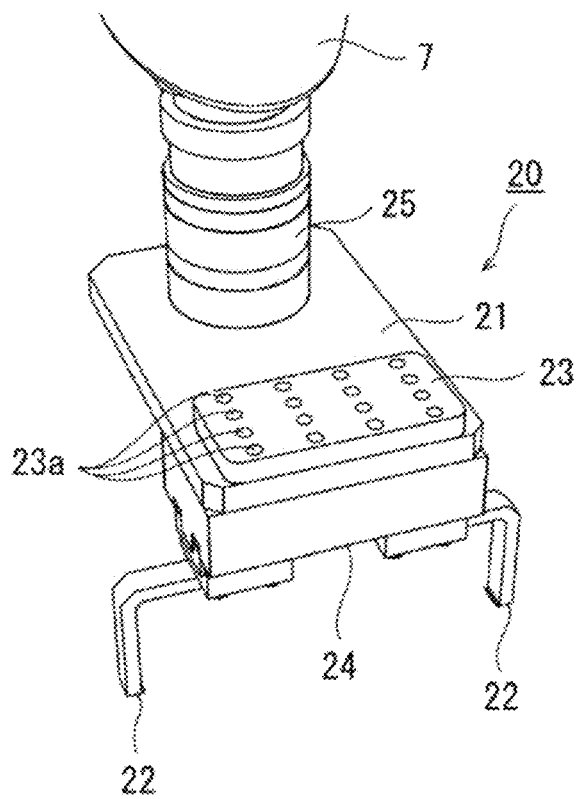
FIG. 4 is a perspective view illustrating a configuration of a second end effector.

Next, a configuration of the end effector 20 attached to the tip end of the left arm 3 is described. FIG. 4 is a perspective view illustrating the configuration of the end effector 20. The end effector 20 corresponds to a "second end effector" of the present disclosure. As illustrated in FIG. 4, the end effector 20 includes a platform 25, a base 21, a pair of grippers 22 provided to the base 21, and a placing part 23.

The platform 25 has a cylindrical shape. An upper part of the platform 25 is coupled to the mechanical interface 9 (see FIG. 2) provided to the wrist part 7 of the left arm 3, and a lower part of the platform 25 is coupled to the base 21.

The base 21 has a flat-plate shape. A base end of an upper surface of the base 21 is detachably coupled to the lower part of the platform 25. The placing part 23 is disposed at a tip end of the upper surface of the base 21. The placing part 23 has a flat-plate shape. The placing part 23 has a placement space where a plurality of threaded elements are placeable. In this embodiment, sixteen (4×4) recesses 23a are formed in an upper surface of the placing part 23. Each recess 23a has a volume according to the shape of a tip-end of the threaded element. Sixteen threaded elements can be placed in the recesses 23a of the placing part 23.

The pair of grippers 22 are driven by an actuator 24 provided to a tip end of a lower surface of the base 21 at the tip-end side to translate while maintaining the parallelism so that they approach and separate to/from each other. The pair of grippers 22 are configured to grip the second substrate 102.

Figure 5:
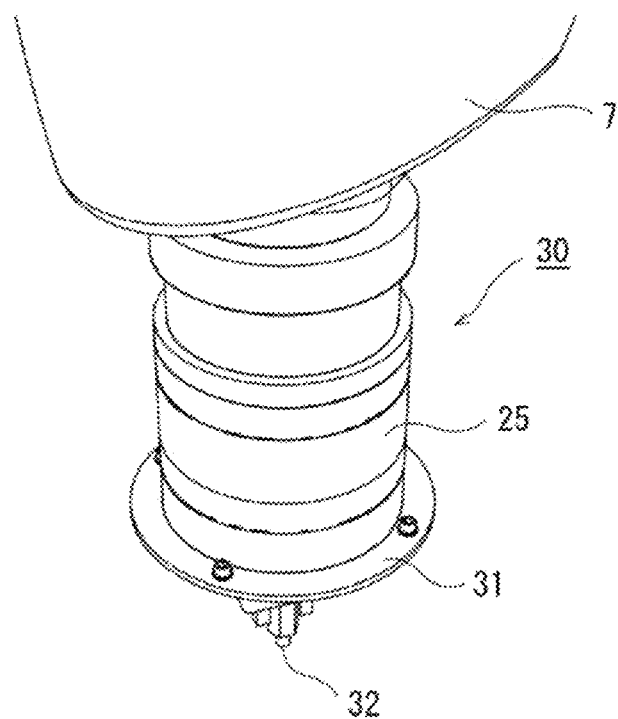
FIG. 5 is a perspective view illustrating a configuration of a third end effector.

Next, a configuration of an end effector 30 which is detachably attached to the tip end of the left arm 3 is described. FIG. 5 is a perspective view illustrating the configuration of the end effector 30. The end effector 30 corresponds to a "third end effector" of the present disclosure. As illustrated in FIG. 5, the end effector 30 includes the platform 25 coupled to the wrist part 7 of the left arm 3, a base 31 detachably attached to the platform 25, and a threadedly-fastening part 32 provided to the base 31. The base 31 has a cylindrical shape. An upper surface of the base 31 is coupled to the platform 25, and a lower surface of the base 31 is coupled to the threadedly-fastening part 32.

The threadedly-fastening part 32 is configured to hold a threaded spacer for connecting the first substrate 101 and the second substrate 102 to each other, and threadedly fasten the threaded spacer. The configuration of the threadedly-fastening part 32 is not limited in particular.

Figure 6:
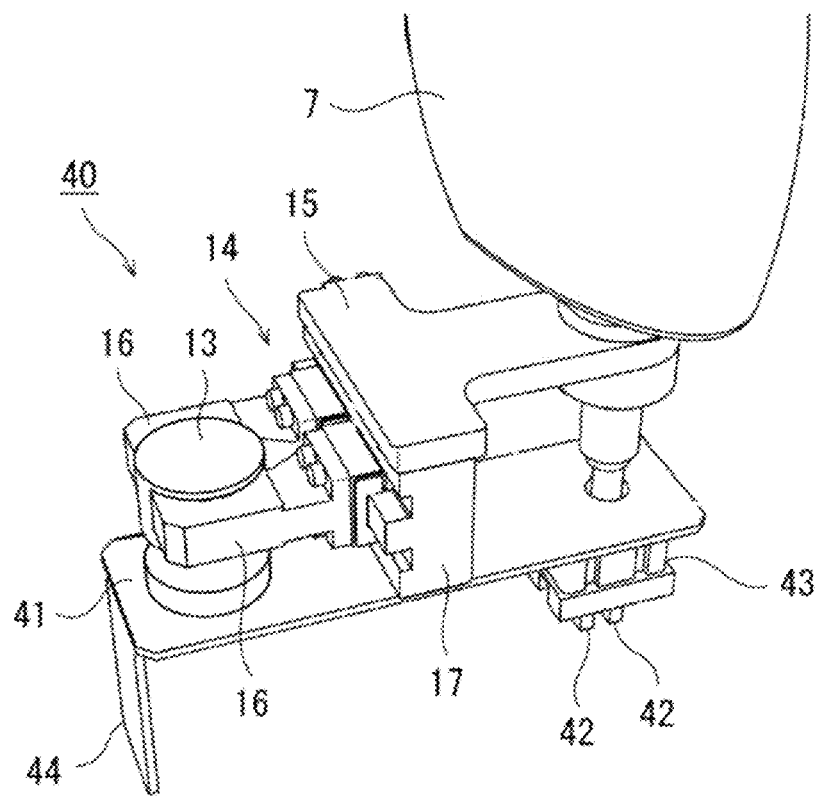
FIG. 6 is a perspective view illustrating a configuration of a fourth end effector.

Next, a configuration of an end effector 40 which is detachably attached to the tip end of the right arm 3 is described. The end effector 40 corresponds to a "fourth end effector" of the present disclosure. FIG. 6 is a perspective view illustrating the configuration of the end effector 40. As illustrated in FIG. 6, the end effector 40 includes the base hand 14, the adapter 13 held by the base hand 14, a base 41 coupled to the adapter 13, and a pair of grippers 42 provided to a lower part of the base 41.

The base 41 has a flat-plate shape. One end of the upper surface of the base 41 is coupled to a lower part of the adapter 13. Moreover, a pressing part 44 is attached to the one end of the upper surface of the base 41. The pressing part 44 has a flat-plate shape. The work plate 71 is conveyed on the conveyor 65 by pressing the pressing part 44 against the work plate 71 on the conveyor 65. The pair of grippers 42 are coupled to each other through an actuator 43 provided to a lower part at the other end of the base 41. The pair of grippers 42 are driven by the actuator 43 to translate while maintaining the parallelism so that they approach and separate to/from each other. The pair of grippers 42 are configured to grip the electronic component 104.

Figure 7:
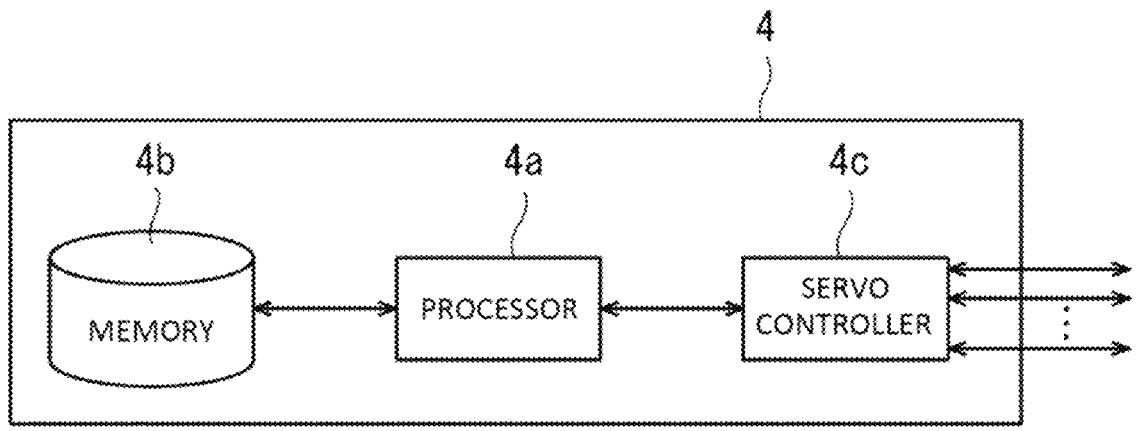
FIG. 7 is a functional block diagram schematically illustrating a configuration of a controller.

FIG. 7 is a functional block diagram schematically illustrating a configuration of the controller 4 of the robot 1 of FIG. 2. As illustrated in FIG. 7, the controller 4 includes a processor 4a such as a CPU, a memory 4b such as a ROM and/or a RAM, and a servo controller 4c. The controller 4 is a robot controller provided with a computer, such as a microcontroller, for example. Note that the controller 4 may be comprised of a sole controller 4 which carries out a centralized control, or may be comprised of a plurality of controllers 4 which collaboratively carry out a distributed control.

The memory 4b stores information, such as a basic program as the robot controller, various fixed data, etc. The processor 4a controls various operations of the robot 1 by reading and executing software, such as the basic program stored in the memory 4b. That is, the processor 4a generates a control command of the robot 1 and outputs it to the servo controller 4c. The servo controller 4c controls the drive of the servomotors corresponding to the joints J1-J4 of each arm 3 of the robot 1 based on the control command generated by the processor 4a. Moreover, the controls of operations of the end effectors 10, 20, 30, and 40 are also performed by the controller 4. Therefore, the controller 4 controls the operation of the entire robot 1.

Figure 8:
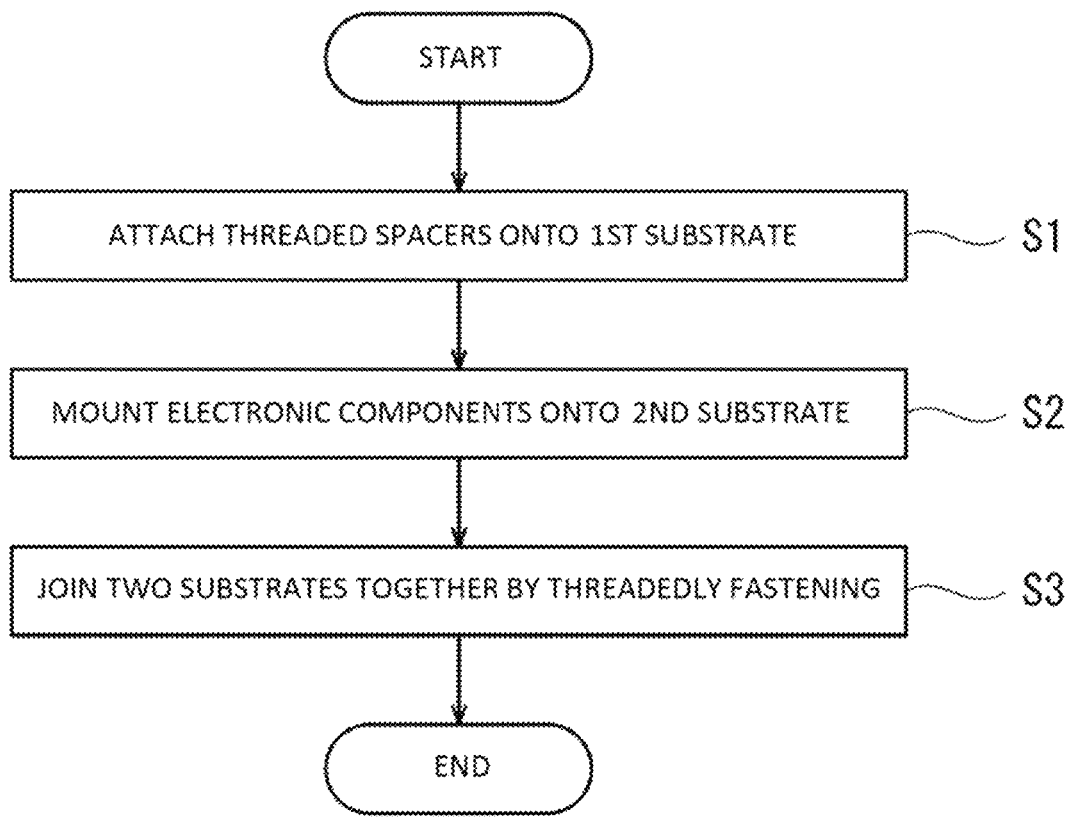
FIG. 8 is a flowchart illustrating a procedure of operation of the substrate assembling device.
Figure 9:
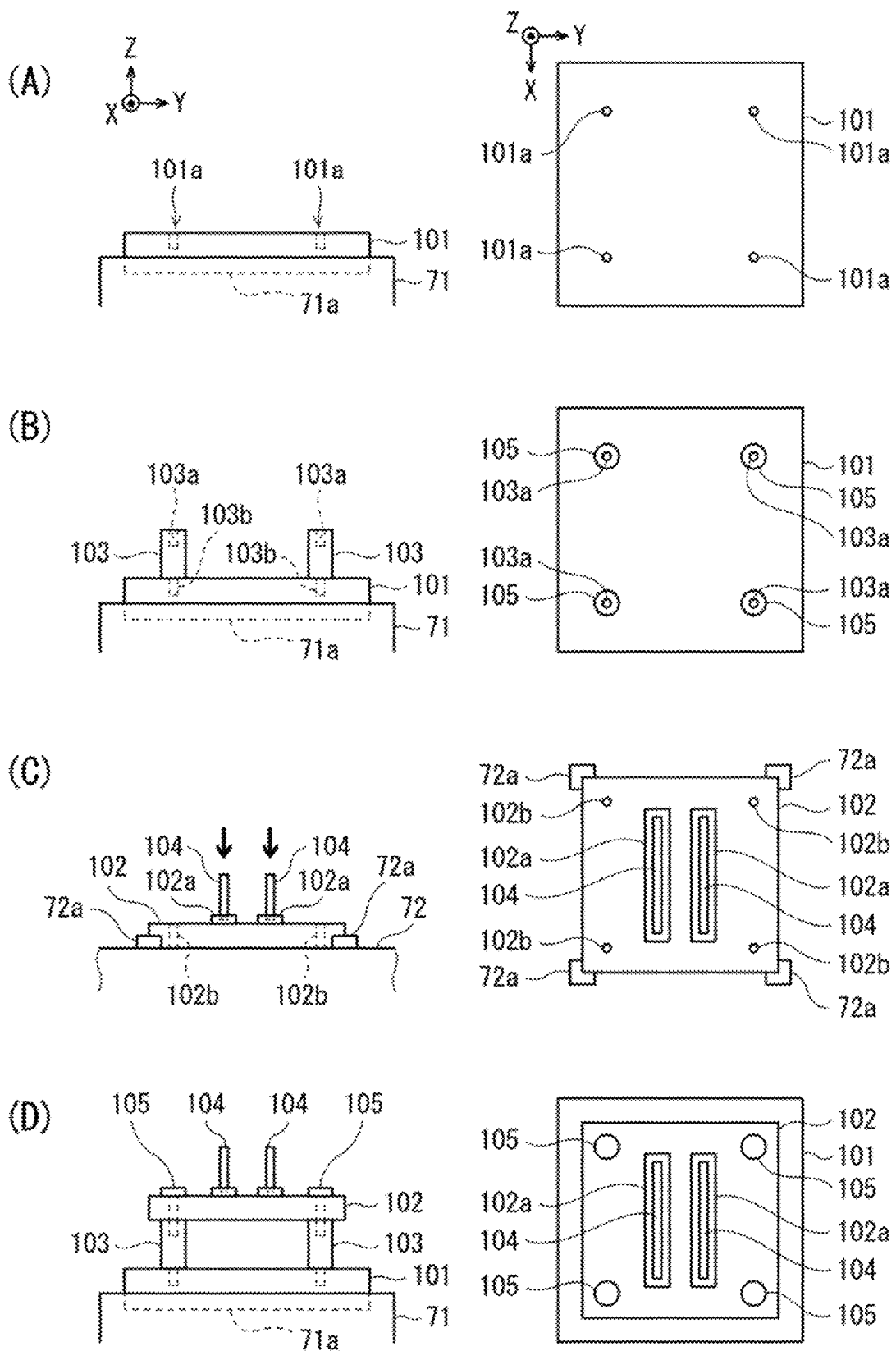
FIGS. 9(A) to 9(D) are views illustrating a process of a substrate assembly.
Figure 10:
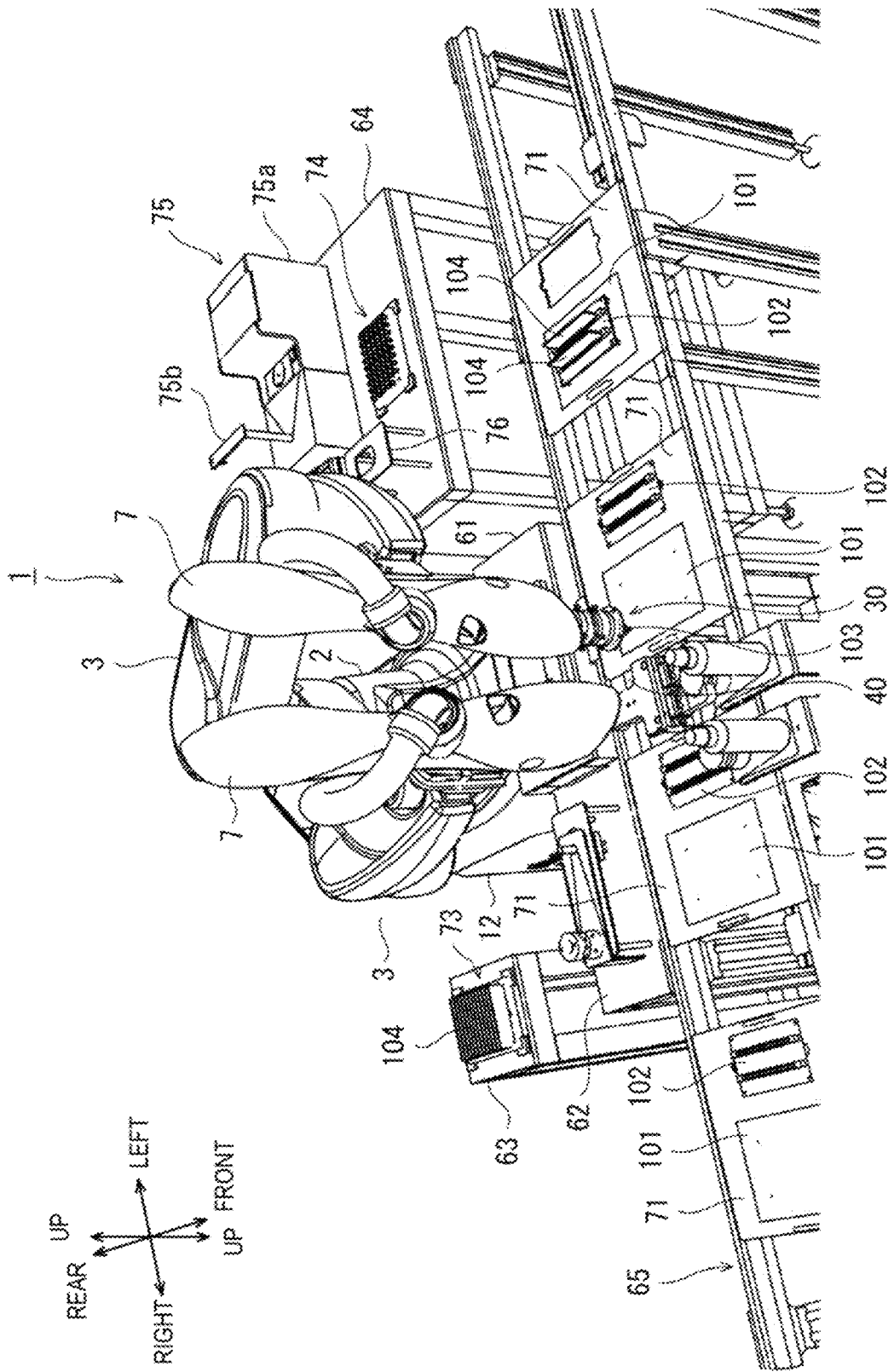
FIG. 10 is a first view illustrating the operation of the substrate assembling device.
Figure 11:
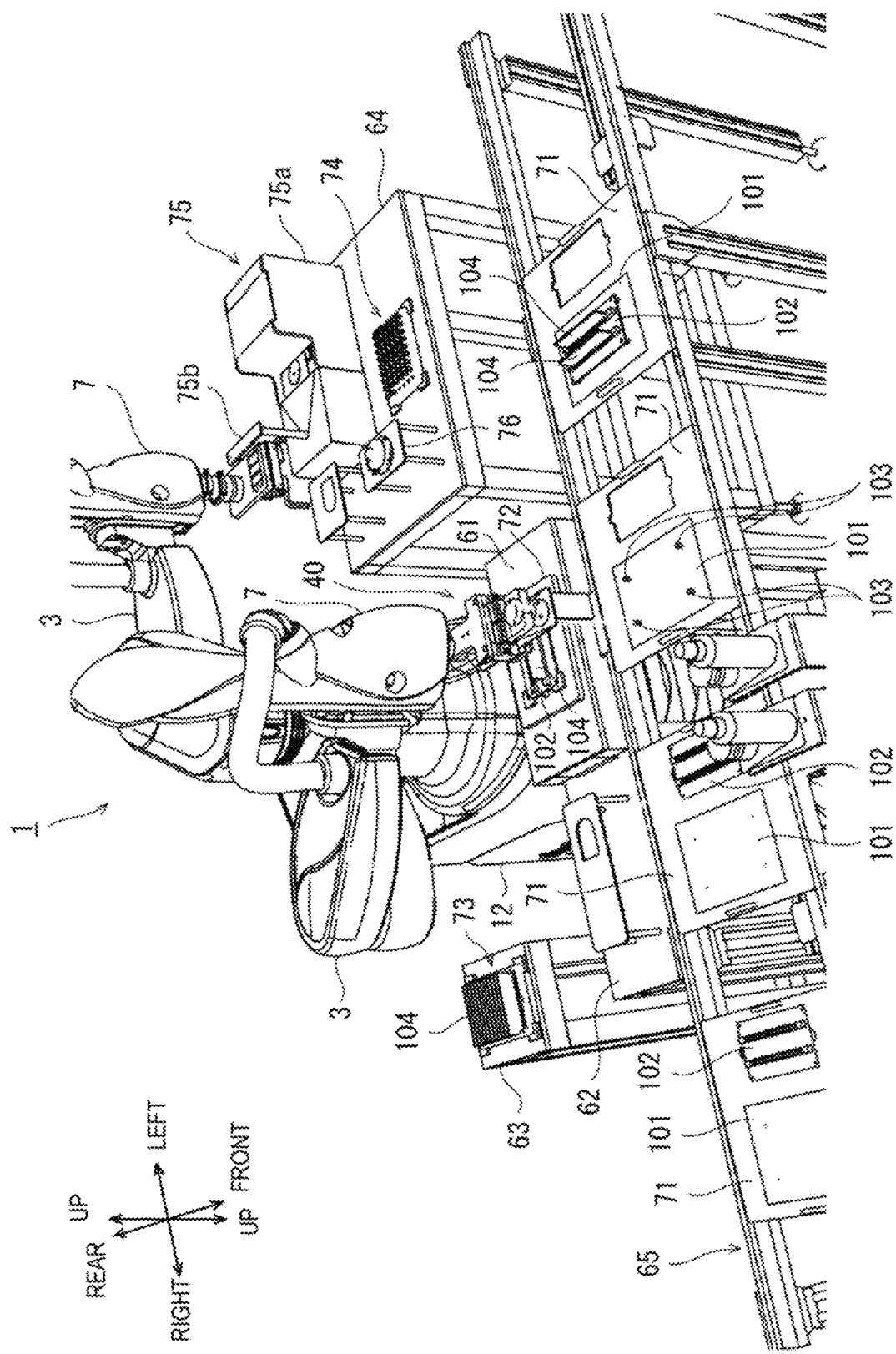
FIG. 11 is a second view illustrating the operation of the substrate assembling device.

Next, the substrate assembly by the robot 1 (substrate assembling device) of this embodiment is described using the drawings. Note that the operation of the robot 1 is also a substrate assembly method according to this embodiment. FIG. 8 is a flowchart illustrating a procedure of the operation of the robot 1. FIGS. 9(A) to 9(D) are front views and plan views illustrating a process of the substrate assembly. FIGS. 10 and 11 are views illustrating the operation of the robot 1. Prior to a start of the substrate assembly, the first substrate 101 is placed at a predetermined position on the work plate 71 in advance (see FIG. 9(A)). A recess 71a of a shape according to the first substrate 101 is formed in an upper surface of the work plate 71, and the first substrate 101 is fitted in the recess 71a. Therefore, the first substrate 101 is fixed at the predetermined position on the work plate 71. Four tapped holes 101a are formed near four corners of the first substrate 101 of a rectangular shape in the plan view.

First, the robot 1 attaches threaded spacers 103 onto the first substrate 101 (see Step S1 of FIG. 8). In detail, the controller 4 controls the operation of the left arm 3 to attach the end effector 30 to the tip end of the left arm 3. Then, the controller 4 controls the operation of the left arm 3 to hold the threaded spacer 103 placed in the thread case 74 on the fourth table 64 by using the end effector 30, and threadedly fasten the held threaded spacer 103 onto the first substrate 101 (see FIG. 10). Here, as illustrated in FIG. 9(B), an internal thread 103a is formed in an upper end of the threaded spacer 103, and an external thread 103b is formed in a lower end of the threaded spacer 103. The threaded spacers 103 are threadedly fastened to the four tapped holes 101a on the first substrate 101.

Next, the robot 1 mounts the electronic components 104 on the second substrate 102 (see Step S2 of FIG. 8). In detail, the controller 4 controls the operation of the left arm 3 to attach the end effector 20 to the tip end of the left arm 3. Then, the controller 4 controls the operation of the left arm 3 to hold the second substrate 102 by the end effector 20 and place the held second substrate 102 on the workbench 72 of the first table 61 by the end effector 20. Here, as illustrated in FIG. 9(C), the four corners of the second substrate 102 are fixed by four fixing jigs 72a provided on the workbench 72.

On the other hand, the controller 4 controls the operation of the right arm 3 to attach the end effector 40 to the tip end of the right arm 3. Then, the controller 4 controls the operation of the right arm 3 to hold the electronic component 104 accommodated in the component case 73 of the third table 63 by the end effector 40, and mount the held electronic component 104 onto the second substrate 102 placed on the workbench 72 of the first table 61 by the end effector 40 (see FIG. 11). Here, as illustrated in FIG. 9(C), the electronic components 104 are mounted onto the second substrate 102 through connecting terminals 102a. Moreover, four through-holes 102b are formed near the four corners of the second substrate 102 of a rectangular shape in the plan view.

Next, the robot 1 joins the first substrate 101 and the second substrate 102 together by threadedly fastening (see Step S3 of FIG. 8). In detail, first, the controller 4 controls the operation of the left arm 3 to feed the threaded element 105 to the end effector 20. The controller 4 moves the end effector 20 to a predetermined position near the threaded element feeding device 75 of the fourth table 64 (see FIG. 11), and feeds the threaded element 105 to the end effector 20 (the placing part 23 of the threaded element) by the threaded element feeding device 75 (the threaded element feeding unit 75b). On the other hand, the controller 4 controls the operation of the right arm 3 to attach the end effector 10 to the tip end of the right arm 3. Then, the controller 4 controls the operation of the left arm 3 to grip the second substrate 102 of the workbench 72 by the end effector 20 (the pair of grippers 22) and convey the second substrate 102 to the work plate 71, and position the second substrate 102 on the first substrate 101 on the work plate 71 (see FIG. 1). On the other hand, the controller 4 controls the operation of the right arm 3 to hold the threaded element 105 placed on the end effector 20 (the placing part 23) by the end effector 10 and threadedly fasten the held threaded element 105. As illustrated in FIG. 9(D), the threaded elements 105 are threadedly fastened to the internal threads 103a at the upper ends of the four threaded spacers 103 on the first substrate 101 through the four through-holes 102b formed in the second substrate 102. Therefore, the first substrate 101 and the second substrate 102 are joined together, and the substrate assembly is finished.

According to this embodiment, the dual-arm type robot 1 uses the end effector 20 (the pair of grippers 22) to position the second substrate 102 on the first substrate 101, while gripping the second substrate 102. Then, it uses the end effector 10 to hold the threaded element 105 placed in the placing part 23 of the end effector 20 and threadedly fasten the second substrate 102 with the held threaded element 105. Thus, the substrate can be assembled by pasting the first substrate 101 and the second substrate 102 together. Therefore, the productivity of the substrate assembly accompanied by the threadedly fastening can be improved.

Note that, in this embodiment, since the first substrate 101 and the second substrate 102 can be joined together with a predetermined gap therebetween by using the threaded spacers 103, they will not contact the upper surface of the first substrate 101, even if the terminals etc. of the electronic component 104 exist on the backside of the second substrate 102.

Moreover, in this embodiment, since the placing part 23 has the placement space (the recess 23a) where the plurality of threaded elements 105 are placeable, it is unnecessary to feed the threaded elements 105 during the substrate assembly. The productivity further improves.

Moreover, in this embodiment, since the end effector 10 is provided with the suction-type driver 12b, the efficient thread fastening can be carried out and the productivity of the substrate assembly further improves.

Modifications

Figure 12:
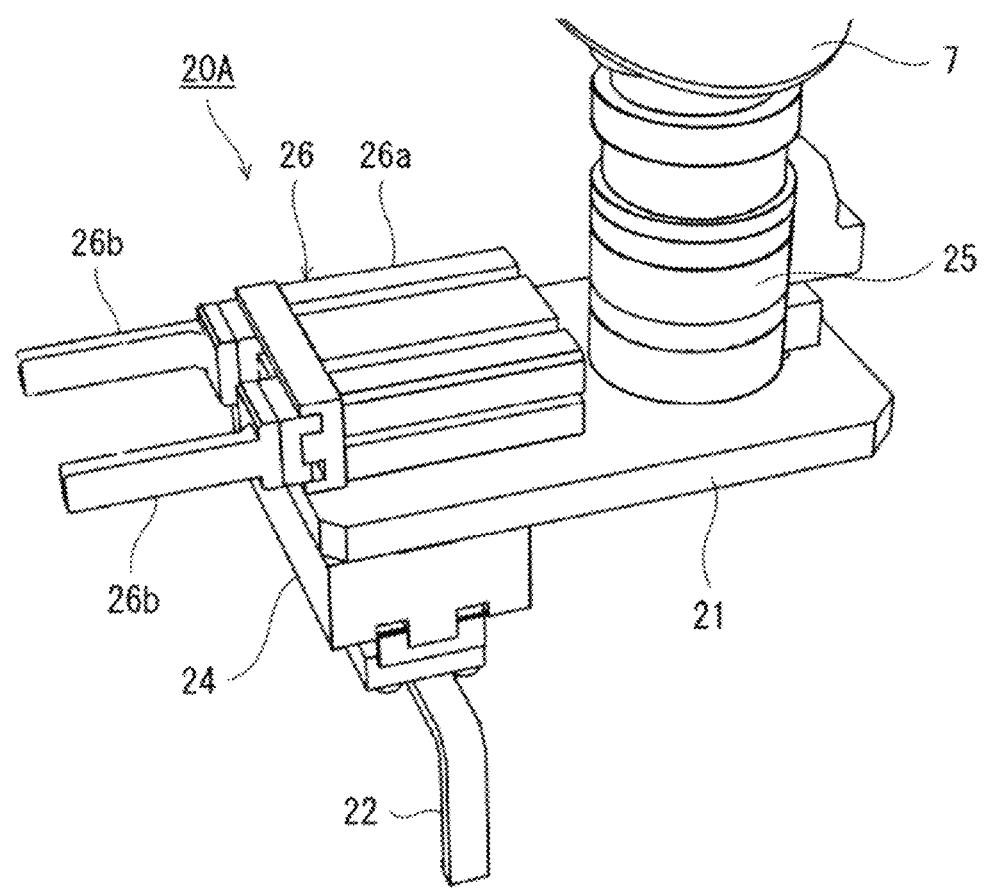
FIG. 12 is a perspective view illustrating a modification of the first end effector.

Next, modifications of this embodiment are described. FIG. 12 is a perspective view illustrating a modification of the end effector 20. An end effector 20A of this modification differs from the end effector 20 of the above embodiment (FIG. 4) in that a coupling part 26 is provided to the tip end of the upper surface of the base 21, instead of the placing part 23. The coupling part 26 of this modification includes an actuator 26a provided to the tip end of the upper surface of the base 21, and a pair of grippers 26b. The pair of grippers 26b are driven by the actuator 26a to translate while maintaining the parallelism so that they approach and separate to/from each other. The pair of grippers 26b are configured to grip a target object. The controller 4 controls the operation of the left arm 3 to attach the end effector 20A to the tip end (the wrist part 7) of the left arm 3.

Figure 13:
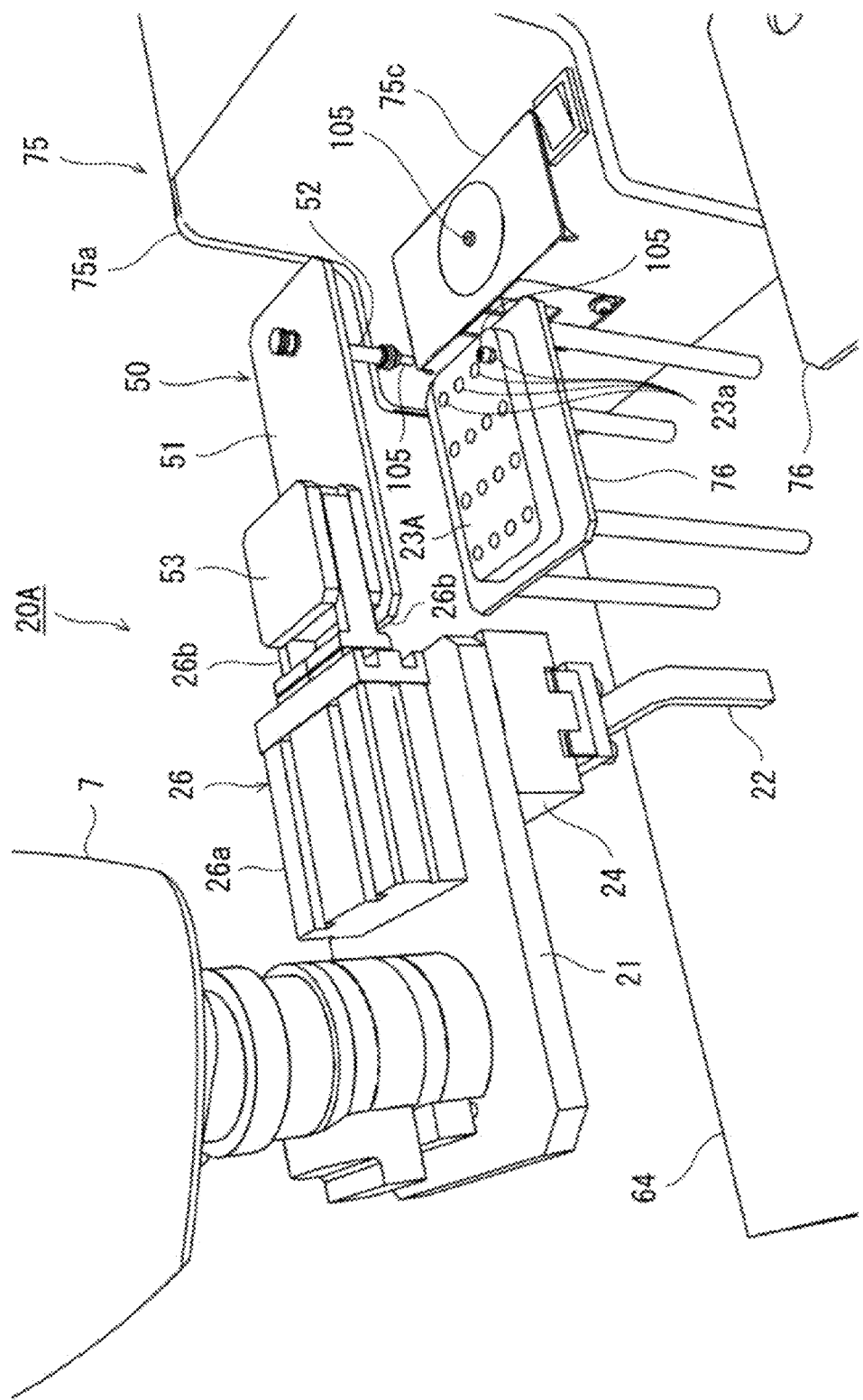
FIG. 13 is a perspective view illustrating a first aspect of the end effector of FIG. 12.

FIG. 13 is a perspective view illustrating a first aspect of the end effector 20A. As illustrated in FIG. 13, in this aspect, the end effector 20A is coupled to a conveying tool 50 through the coupling part 26. The conveying tool 50 includes an adapter 53, a base 51 coupled to the adapter 53, and a threaded element holder 52 provided to a lower part of the base 51. The threaded element holder 52 is configured to hold or release the threaded element 105. The controller 4 controls the operation of the left arm 3 to grip the adapter 13 of the conveying tool 50 by the pair of grippers 26b of the coupling part 26. Therefore, the conveying tool 50 is coupled to the end effector 20A.

The controller 4 controls the operation of the left arm 3 to move the end effector 20A to near the threaded element feeding device 75 of the fourth table 64, hold the threaded element 105 sent out from a stage 75c of the threaded element feeding unit 75b by the threaded element holder 52, and place it in a recess 23a of a placing part 23A disposed on a placement table 76 adjacent to the threaded element feeding unit 75b.

Figure 14:
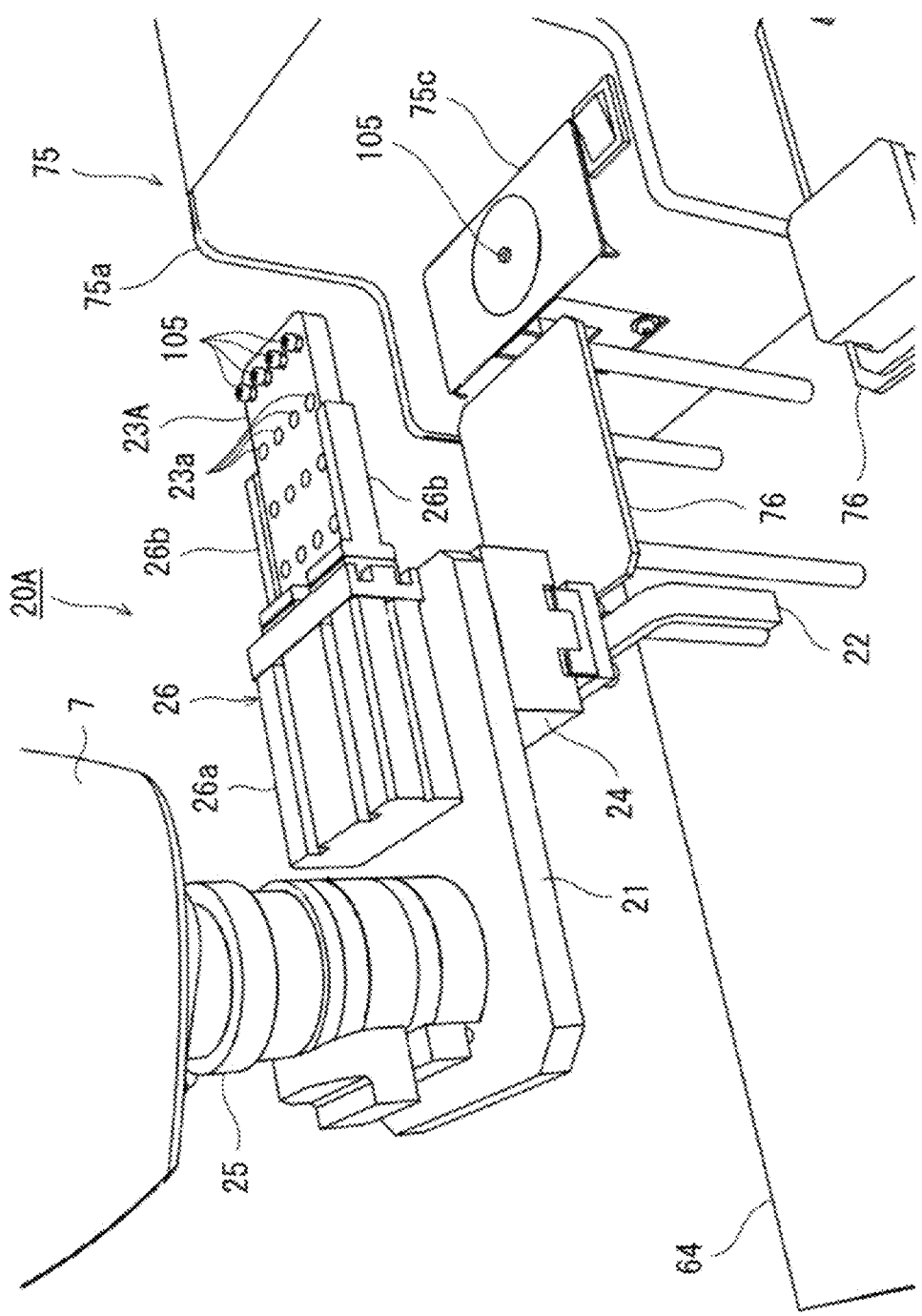
FIG. 14 is a perspective view illustrating a second aspect of the end effector of FIG. 12.

FIG. 14 is a perspective view illustrating a second aspect of the end effector 20A. As illustrated in FIG. 14, in this aspect, the end effector 20A is coupled to the placing part 23A through the coupling part 26. The controller 4 controls the operation of the left arm 3 to grip the placing part 23A by the pair of grippers 26b of the coupling part 26. Therefore, the placing part 23A is coupled to the end effector 20A. Thus, the coupling part 26 of the end effector 20A is configured to detachably attach the threaded element holder 52 or the placing part 23A to the coupling part 26.

Figure 15:
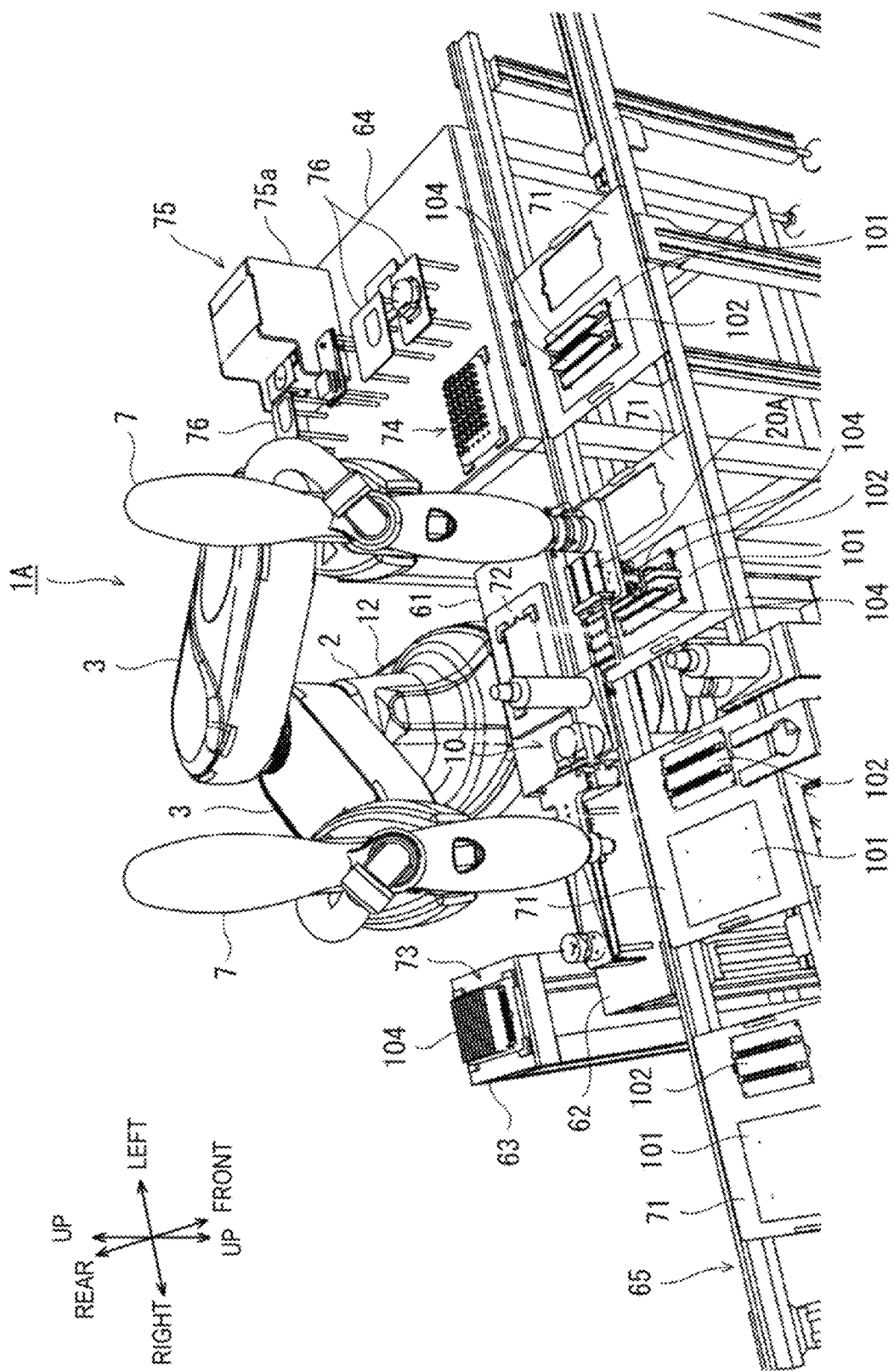
FIG. 15 is a perspective view illustrating operation of the substrate assembling device of this modification.

FIG. 15 is a perspective view illustrating operation of a robot 1A (substrate assembling device) of this modification. As illustrated in FIG. 15, the controller 4 controls the operation of the left arm 3 to position the second substrate 102 on the first substrate 101 by the end effector 20A (the pair of grippers 22), while gripping the second substrate 102. On the other hand, the controller 4 controls the operation of the right arm 3 to hold the threaded element 105 placed on the end effector 20A (the placing part 23A) and threadedly fasten the held threaded element 105, by the end effector 10 so that the first substrate 101 and the second substrate 102 are pasted together to assemble the substrate.

According to this modification, since the robot 1 itself can place the threaded element 105 on the placing part 23A by the threaded element holder 52 coupled to the end effector 20A and can then couple the placing part 23A to the end effector 20A, the threaded element feeding unit 75b (see FIG. 1) of the threaded element feeding device 75 is unnecessary. The substrate assembly can be realized by a robot system alone.

OTHER EMBODIMENTS

Note that, although the substrate assembling device of the above embodiment is comprised of the horizontal articulated dual-arm robot, it may adopt a vertical articulated dual-arm robot.

It is apparent for the person skilled in the art that many improvements and other embodiments of the present disclosure are possible from the above description. Therefore, the above description is to be interpreted only as illustration, and it is provided in order to teach the person skilled in the art the best mode that implements the present disclosure. The details of the structures and/or the functions may be changed substantially, without departing from the spirit of the present disclosure.

INDUSTRIAL APPLICABILITY

The present disclosure is useful for an assembly of a substrate in the manufacturing site of electronic equipment, such as a computer.

What is claimed is:

1. A substrate assembling device configured to join a first substrate and a second substrate together to assemble a substrate, comprising:
a base;
a first arm attached to the base;
a second arm attached to the base;
a first end effector detachably attached to a tip end of the first arm, and configured to hold and fasten a threaded element;
a second end effector detachably attached to a tip end of the second arm; and
a controller configured to control operations of the first arm and the second arm, wherein the second end effector includes a base, a pair of grippers provided to the base of the second end effector and configured to grip the second substrate, and a placing part disposed on the base of the second end effector, where the threaded element is placed, and
wherein the controller is adapted to control the operations of the first arm and the second arm to:
position the second substrate on the first substrate while gripping the second substrate by using the pair of grippers of the second end effector; and
hold the threaded element placed on the placing part of the second end effector and fasten the held threaded element, by using the first end effector, to join the first substrate and the second substrate together and assemble the substrate.

2. The substrate assembling device of claim 1, wherein the second end effector further includes a coupling part configured to detachably attach a threaded element holder or the placing part to the coupling part, the threaded element holder being configured to hold the threaded element, and
wherein the controller controls the operations of the first arm and the second arm so that the threaded element holder is coupled to the coupling part of the second end effector, the threaded element holder places the held threaded element on the placing part disposed at a predetermined position, the placing part is coupled to the coupling part of the second end effector, the pair of grippers of the second end effector positions the second substrate on the first substrate while gripping the second substrate, and the first end effector holds the threaded element placed on the placing part of the second end effector and fastens the held threaded element to join the first substrate and the second substrate together and assemble the substrate.

3. The substrate assembling device of claim 1, wherein the placing part has placement spaces where the threaded element is placeable.

4. The substrate assembling device of claim 1, further comprising a third end effector configured to be detachably attached to a tip end of one arm of the first arm and the second arm, and configured to hold a threaded spacer configured to connect the first substrate and the second substrate to each other and to fasten the threaded spacer,
wherein the controller controls the operation of the one arm so that the third end effector is attached to the tip end of the one arm, and the third end effector holds the threaded spacer and fastens the held threaded spacer onto the first substrate.

5. The substrate assembling device of claim 4, further comprising a fourth end effector configured to be detachably attached to a tip end of an other arm of the first arm and the second arm, and configured to hold an electronic component,
wherein the controller controls the operation of the other arm so that the fourth end effector is attached to the tip end of the other arm, and the fourth end effector mounts the held electronic component onto the second substrate.

6. The substrate assembling device of claim 1, wherein the first end effector is configured to hold the threaded element by sucking the threaded element with negative pressure and to fasten the threaded element.

7. A substrate assembling method of joining, a first substrate and a second substrate together to assemble a substrate by a substrate assembling device provided with:
a base;
a first arm attached to the base;
a second arm attached to the base;
a first end effector detachably attached to a tip end of the first arm, and configured to hold and fasten a threaded element;
a second end effector detachably attached to a tip end of the second arm; and
a controller configured to control operations of the first arm and the second arm,
wherein the second end effector includes a base, a pair of strippers provided to the base of the second end effector and configured to grip the second substrate, and a placing part disposed in the base of the second end effector, where the threaded element is placed, and
wherein the controller is adapted to control the operations of the first arm and the second arm to:
position the second substrate on the first substrate while gripping the second substrate, by the pair of grippers of the second end effector; and
hold the threaded element placed on the placing part of the second end effector and fasten the held threaded element, by the first end effector, to join the first substrate and the second substrate together and assemble the substrate.

8. The substrate assembling device of claim 2, wherein the placing part has placement spaces where the threaded element is placeable.

9. The substrate assembling device of claim 2, wherein the first end effector is configured to hold the threaded element by sucking the threaded element with negative pressure and to fasten the threaded element.

10. The substrate assembling device of claim 3, wherein the first end effector is configured to hold the threaded element by sucking the threaded element with negative pressure and to fasten the threaded element.

11. The substrate assembling device of claim 2, further comprising a third end effector configured to be detachably attached to a tip end of one arm of the first arm and the second arm, and configured to hold a threaded spacer configured to connect the first substrate and the second substrate to each other and to fasten the threaded spacer,
wherein the controller controls the operation of the one arm so that the third end effector is attached to the tip end of the one arm, and the third end effector holds the threaded spacer and fastens the held threaded spacer onto the first substrate.

12. The substrate assembling device of claim 11, further comprising a fourth end effector configured to be detachably attached to a tip end of an other arm of the first arm and the second arm, and configured to held an electronic component,
wherein the controller controls the operation of the other arm so that the fourth end effector is attached to the tip end of the other arm, and the fourth end effector mounts the held electronic component onto the second substrate.

13. The substrate assembling device of claim 3, further comprising a third end effector configured to be detachably attached to a tip end of one arm of the first arm and the second arm, and configured to hold a threaded spacer configured to connect the first substrate and the second substrate to each other and to fasten the threaded spacer, wherein the controller controls the operation of the one arm so that the third end effector is attached to the tip end of the one arm, and the third end effector holds the threaded spacer and fastens the held threaded spacer onto the first substrate.

14. The substrate assembling device of claim 13, further comprising a fourth end effector configured to be detachably attached to a tip end of an other arm of the first arm and the second arm, and configured to held an electronic component, wherein the controller controls the operation of the other arm so that the fourth end effector is attached to the tip end of the other arm, and the fourth end effector mounts the held electronic component onto the second substrate.

15. The substrate assembling device of claim 6, further comprising a third end effector configured to be detachably attached to a tip end of one arm of the first arm and the second arm, and configured to hold a threaded spacer configured to connect the first substrate and the second substrate to each other and to fasten the threaded spacer, wherein the controller controls the operation of the one arm so that the third end effector is attached to the tip end of the one arm, and the third end effector holds the threaded spacer and fastens the held threaded spacer onto the first substrate.

16. The substrate assembling device of claim 15, further comprising a fourth end effector configured to be detachably attached to a tip end of an other arm of the first arm and the second arm, and configured to hold an electronic component, wherein the controller controls the operation of the other arm so that the fourth end effector is attached to the tip end of the other arm, and the fourth end effector mounts the held electronic component onto the second substrate.

17. The substrate assembling device of claim 8, further comprising a third end effector configured to be detachably attached to a tip end of one arm of the first arm and the second arm, and configured to hold a threaded spacer configured to connect the first substrate and the second substrate to each other and to fasten the threaded spacer, wherein the controller controls the operation of the one arm so that the third end effector is attached to the tip end of the one arm, and the third end effector holds the threaded spacer and fastens the held threaded spacer onto the first substrate.

18. The substrate assembling device of claim 17, further comprising a fourth end effector configured to be detachably attached to a tip end of the other arm of the first arm and the second arm and configured to hold an electronic component, wherein the controller controls the operation of the other arm so that the fourth end effector is attached to the tip end of the other arm, and the fourth end effector mounts the held electronic component onto the second substrate.

19. The substrate assembling device of claim 9, further comprising a third end effector configured to be detachably attached to a tip end of one arm of the first arm and the second arm, and configured to hold a threaded spacer configured to connect the first substrate and the second substrate to each other and to fasten the threaded spacer, wherein the controller controls the operation of the one arm so that the third end effector is attached to the tip end of the one arm, and the third end effector holds the threaded spacer and fastens the held threaded spacer onto the first substrate.

20. The substrate assembling device of claim 19, further comprising a fourth end effector configured to be detachably attached to a tip end of an other arm of the first arm and the second arm, and configured to held an electronic component, wherein the controller controls the operation of the other arm so that the fourth end effector is attached to the tip end of the other arm, and the fourth end effector mounts the held electronic component onto the second substrate.

* * * * *